(12) United States Patent
Ohno

(10) Patent No.: US 6,490,024 B1
(45) Date of Patent: Dec. 3, 2002

(54) IMAGE FORMING DEVICE

(75) Inventor: Takehisa Ohno, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 9 days.

(21) Appl. No.: 09/706,708

(22) Filed: Nov. 7, 2000

(30) Foreign Application Priority Data

Nov. 10, 1999 (JP) ............................................ 11-319610

(51) Int. Cl.$^7$ ........................ G03B 27/32; G03B 29/00; G03B 27/72; B41J 17/00; H01L 27/00
(52) U.S. Cl. ............................. 355/27; 355/28; 355/35; 355/53; 355/55; 355/67; 347/215; 347/224; 347/187; 347/234; 347/235; 250/208.1; 250/216
(58) Field of Search .............................. 355/27, 28, 35, 355/53, 55, 67; 347/215, 224, 187, 234, 235; 250/208.1, 216

(56) References Cited

U.S. PATENT DOCUMENTS

| | | | | |
|---|---|---|---|---|
| 5,115,304 A | * | 5/1992 | Yoshikawa et al. | |
| 5,646,673 A | * | 7/1997 | Kodama | |
| 6,140,629 A | * | 10/2000 | Nagashima | |
| 6,211,899 B1 | * | 4/2001 | Yoshida | |

* cited by examiner

*Primary Examiner*—Russell Adams
*Assistant Examiner*—Khaled Brown
(74) *Attorney, Agent, or Firm*—Sughrue Mion, PLLC

(57) ABSTRACT

An image forming device in which a plurality of image frames are exposed onto a photosensitive material at an exposure device, and the photosensitive material is superposed with image receiving materials of same sizes as the image frames on a heat drum, such that a plurality of image frames can be heat transferred all at once onto the image receiving materials. Image receiving materials of different sizes are readied in a plurality of magazines, and an image receiving material (magazine) of an appropriate size is selected in accordance with an exposure pattern and sizes of the image frames. Various types of prints can be formed by merely setting one photosensitive material. Further, because the plurality of image frames are heat transferred onto the image receiving materials all at once, printing processing efficiency can be improved. Moreover, if the image frames are exposed in an exposure pattern such that spaces between the image frames are kept to a minimum, a loss of photosensitive material can be kept to a minimum. In the image forming device, automation of printing processing and an improvement in printing processing efficiency can be achieved, and loss of photosensitive material can be kept to a minimum.

21 Claims, 15 Drawing Sheets

IMAGE FORMING DEVICE

BACKGROUND OF THE INVENTION

1. Field of the Invention

The present invention relates to an image forming device which heat-transfers images, which are exposed on a photosensitive material, onto image receiving materials.

2. Description of the Related Art

As illustrated in FIG. 15, in a conventional heat-transfer-type image forming device, a photosensitive material 120, which is wound in roll form and loaded in a magazine for a photosensitive material, is cut into sheet-shaped photosensitive materials 120A. A single image frame M is exposed onto the photosensitive material 120A at an exposure device 122. In a solution application process, a solvent is applied onto the surface of the photosensitive material 120A, and the photosensitive material 120A is then sent to a heat transfer process.

Further, an image receiving material 124, which is wound in roll form and loaded in a magazine for an image receiving material, is cut into sheet-shaped image receiving materials 124A. The image receiving material 124A is superposed with the photosensitive material 120A at a laminating roller 126, and the laminated materials are trained about a heat drum 128 such that the image frame M of the photosensitive material 120A is heat-transferred to the image receiving material 124A.

Namely, in the conventional image forming device, there is a one-to-one relationship between the one magazine for a photosensitive material and the one magazine for an image receiving material. As a result, each time the print size changes, the operator must change the magazine. The system cannot be fully automated, and there are limits to the efficiency of printing processing.

Even if the measure is taken of replacing the magazine for an image receiving material, with respect to a single magazine for a photosensitive material, each time the print size changes, there is a great loss of photosensitive material if the prints are small size. This loss becomes marked when there are plural prints of the same image frame.

SUMMARY OF THE INVENTION

In view of the aforementioned, an object of the present invention is to provide an image forming device in which printing processing is automated, the printing processing efficiency is improved, and the loss of photosensitive material is kept to a minimum.

In a first aspect of the present invention, a plurality of image frames are exposed onto a photosensitive material at an exposure section, and thereafter, a solvent is applied to the photosensitive material. The photosensitive material is then superposed with (a corresponding number of pieces of) an image receiving material, and the plurality of image frames of the photosensitive material are heat transferred all at once onto the image receiving material.

In this way, merely by setting one photosensitive material, various types of prints are possible. Because a plurality of image frames are heat transferred all at once onto the image receiving material, the printing processing efficiency can be improved.

In a second aspect of the present invention, the image receiving materials are shaped to sizes corresponding to the respective image frames, and are superposed substantially simultaneously with the respective image frames. As a result, prints of different sizes can be heat transferred and discharged all at once, without having to cut the image receiving materials later.

In a third aspect of the present invention, the image forming device includes a plurality of magazines which house image receiving materials, and a selecting section which selects a magazine in accordance with the sizes and the exposure pattern of the image frames recorded on the photosensitive material.

In this way, the selecting means automatically selects a magazine in accordance with the sizes and the exposure pattern of the image frames exposed on the photosensitive material. Automatic printing is thereby made possible, and the printing processing efficiency is improved.

In a fourth aspect of the present invention, a plurality of image receiving materials are housed in a single magazine. As a result, space is not required for providing plural magazines, and the device can be made compact.

In a fifth aspect of the present invention, the image receiving materials fed out from the magazine are distributed in a direction orthogonal to a conveying direction. In this way, when the plurality of image frames are exposed in a direction orthogonal to the conveying direction, it is not necessary to dispose exactly the same number of magazines as image frame rows in the direction orthogonal to the conveying direction, and the magazine can be moved along the direction orthogonal to the conveying direction of the image receiving materials such that the required image receiving material (pieces) can be supplied.

In a sixth aspect of the present invention, the image receiving material is the same size as the photosensitive materials. After heat transfer, the image receiving material is cut along frames of the image frames. In this structure, the image receiving material must be cut after heat transfer. However, if there is one magazine housing an image receiving material of the same width as the width of the photosensitive material, any type of exposure pattern and any image frame sizes can be handled.

In a seventh aspect of the present invention, the exposure pattern of the image frames at the exposure section is automatically set such that the loss of photosensitive material is kept to a minimum, on the basis of order information such as a designation of an image frame, a designation of a number of prints, a designation of a print size, or the like.

In this structure, the photosensitive material can be used efficiently such that the loss of photosensitive material can be kept to a minimum, i.e., the spaces between the image frames can be kept as small as possible. Further, because the number of image frames which can be heat transferred at one time can be increased, the speed of finishing the prints can be increased.

In an eighth aspect of the present invention, the exposure pattern of the image frames is automatically set in the order in which the image frame information was inputted. In this way, the exposure pattern of the image frames is determined in accordance with the order in which the image frames were photographed, and the prints are discharged from the device in the order of photographing.

In a ninth aspect of the present invention, the exposure pattern of the image frames is automatically set such that the trailing end portions of the image receiving material pieces onto which the image frames have been heat transferred are disposed from a conveying direction downstream side to a conveying direction upstream side in an order in which image frame information was inputted. As a result, the image receiving material pieces drop down from the discharge roller disposed at the discharge opening of the device, in the order in which the image frames were photographed. In this way, even if a special return mechanism or the like is not provided, the prints can be discharged from the device in the order in which they were photographed.

In a tenth aspect of the present invention, a tray, which is disposed in a direction orthogonal to the discharging direction, is provided at the image receiving material discharge opening. By providing such a return mechanism, there is no need to longitudinally shift the positions of the trailing end portions of the image receiving material pieces as in the ninth aspect. Even if the trailing end portions of the image receiving material pieces are disposed in one transverse line, the prints can be discharged from the device in the order of photographing.

In an eleventh aspect of the present invention, at least one order information, such as a designation of an image frame, a designation of a number of prints, a designation of a print size or the like, can be inputted from the information medium on which the order information is recorded together with image information.

Namely, by merely loading the information medium into the image forming device, printing of, for example, the designated number of prints can be carried out automatically without operating the operation panel of the image forming device.

DESCRIPTION OF THE PREFERRED EMBODIMENTS

Figure 1:
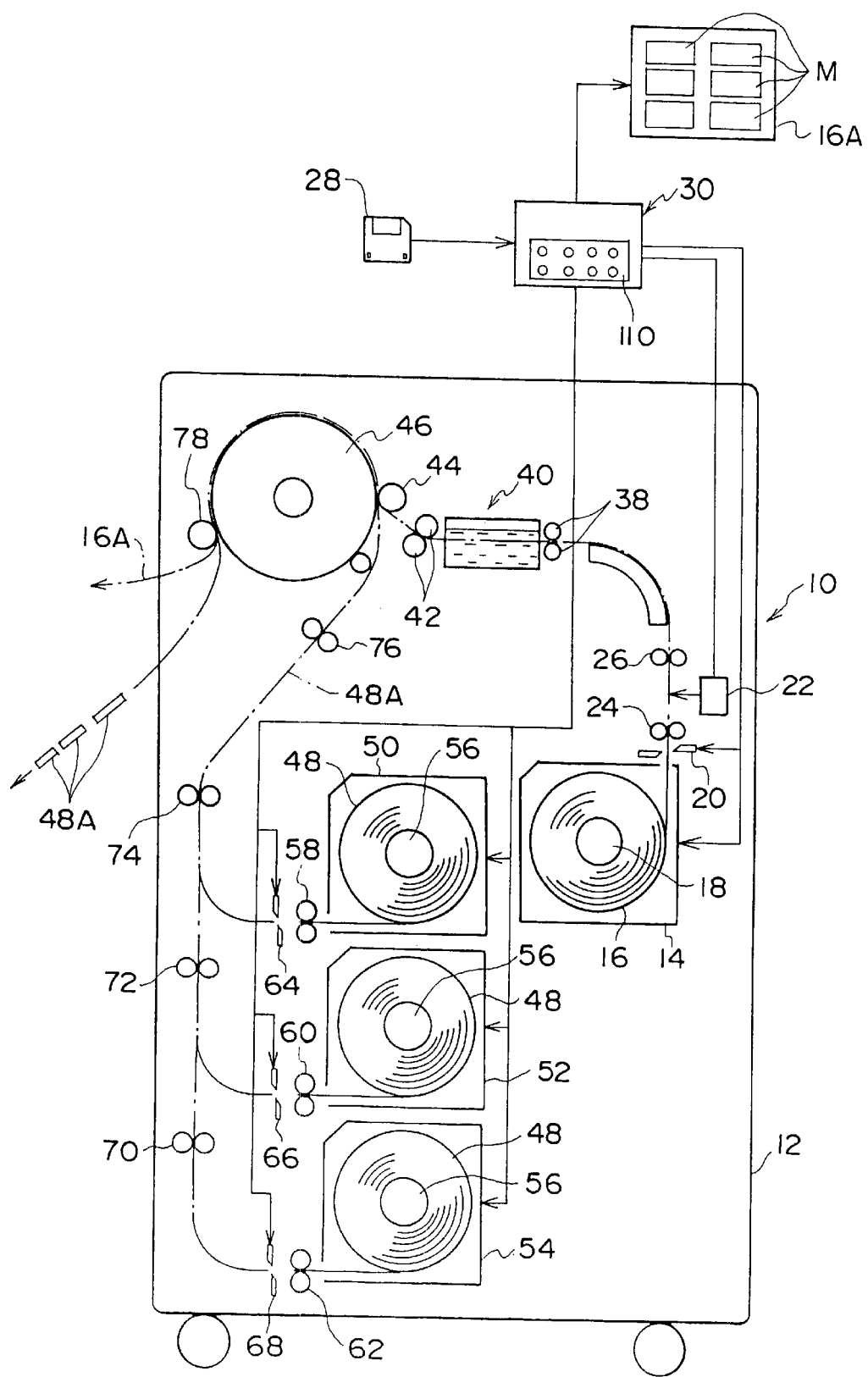
FIG. 1 is a side view illustrating the overall structure of an image forming device relating to a first embodiment.
Figure 2:
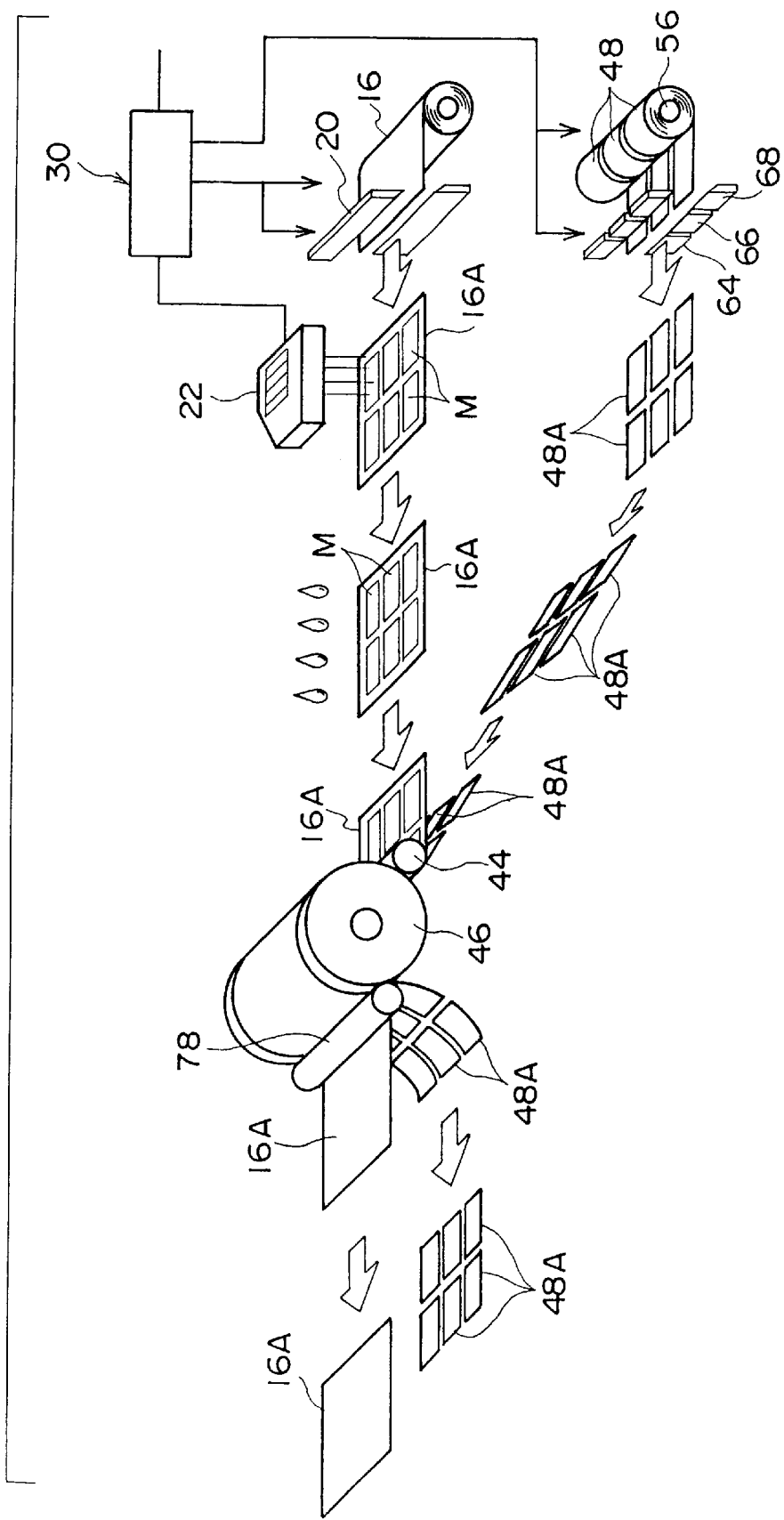
FIG. 2 is a schematic view illustrating the overall structure of the image forming device relating to the first embodiment.

An image forming device 10 relating to a first embodiment of the present invention is illustrated in FIGS. 1 and 2.

A supply reel 18, on which a photosensitive material 16 is wound, is set in a photosensitive material magazine 14 disposed within a housing 12 of the image forming device 10. The supply reel 18 is rotated by a driving means (not shown) controlled by a control section 30 such that the photosensitive material 16 is wound out.

An upper cover of the photosensitive material magazine 14 can be opened and closed. A nip roller is mounted to the free end side of the upper cover. When the upper cover is closed, the nip roller, together with a nip roller mounted to the main body, nips and feeds out the photosensitive material 16.

A cutter 20 controlled by the control section 30 is provided in a vicinity of the pull out opening of the photosensitive material 16. The photosensitive material 16, which has been pulled out by a predetermined amount by the nip rollers, is cut such that sheet-shaped photosensitive materials 16A are formed. The photosensitive material 16A is fed, while the planarity thereof is maintained, in a subscanning direction by conveying rollers 24, 26, and plural image frames M are exposed thereon at an exposure device 22.

Three LED chips of RGB which are lit by image signals are provided at the exposure device 22. (Note that a light source such as LDs or the like may be used.) Based on image information inputted from a floppy disk 28 which serves as an information medium, the image signals are outputted from the control section 30 such that an image pattern having plural image frames M is exposed on a single photosensitive material 16A. The LED chips are lit on the basis of the image signals and the emitted light is collected by a light-collecting lens formed by a plurality of lenses and a diaphragm, such that plural image frames are focused on a single photosensitive material 16A.

Further, the driving of the scanning head is synchronous with the step driving of the photosensitive material 16A (is synchronous with the driving of the conveying rollers 24, 26). Namely, in a state in which the photosensitive material 16A is stopped after making a step movement thereof, the scanning head is moved in a direction orthogonal to the conveying direction (is moved in the main scanning direction). Further, when the photosensitive material 16A is stopped after the next step movement thereof, reciprocal main scanning is carried out. This process is repeated until all of the scannings are completed.

The exposure device which is equipped with the scanning head is mentioned here merely as an example, and the exposure device may have a polygon mirror which deflects and scans light while rotating at high speed. Further, the exposure patterns of the image frames illustrated in the figures is merely one example, and variations thereon will be described later. The image information stored on the floppy disk 28 will also be discussed later.

Next, the photosensitive material 16A, on which the plurality of image frames M have been exposed, is fed to a water application section 40 by feed rollers 38. At the water application section 40, water, which serves as an image forming solvent, is applied to the photosensitive material 16A. The photosensitive material 16A, from which excess water has been squeezed out by a squeeze roller 42, is fed to between a heat drum 46 and a laminating roller 44.

A halogen lamp or an infrared heater or the like is housed in the heat drum 46. The photosensitive material 16A and image receiving materials 48A (which will be described later), which are superposed and are trained around the outer peripheral surface of the heat drum 46 by the laminating roller 44, are conveyed while being heated such that the image frames M of the photosensitive material 16A are heat transferred onto the image receiving materials 48A.

At the lower portion of the housing 12 are provided three image receiving material magazines 50, 52, 54 which are arranged vertically. An image receiving material 48 wound on a supply reel 56 is set in each of the image receiving material magazines 50, 52, 54. The image receiving materials 48 are pulled out by nip rollers 58, 60, 62, and are cut into the image receiving materials 48A of predetermined lengths by cutters 64, 66, 68 which are controlled by the control section 30. Thereafter, the image receiving materials 48 are conveyed to an edge positioning roller 76 by conveying rollers 70, 72, 74. At the edge positioning roller 76, the leading end of the image receiving material 48A stands by, and is then positioned so as to be superposed together with the photosensitive material 16A.

Then, the photosensitive material 16A and the image receiving materials 48A for which heat transfer has been completed are peeled by a peeling roller 78. The photosensitive material 16A which has been used is disposed of, and the image receiving materials 48A are discharged as prints which are completed products.

In this way, a plurality of image frames M are exposed on the photosensitive material 16A, and the plural image receiving materials 48A, which have been cut by the cutters 64, 66, 68 in accordance with the sizes of the image frames M, are supplied such that a plurality of image frames M can be heat transferred at one time. In this way, the efficiency of printing processing can be improved.

Figure 3:
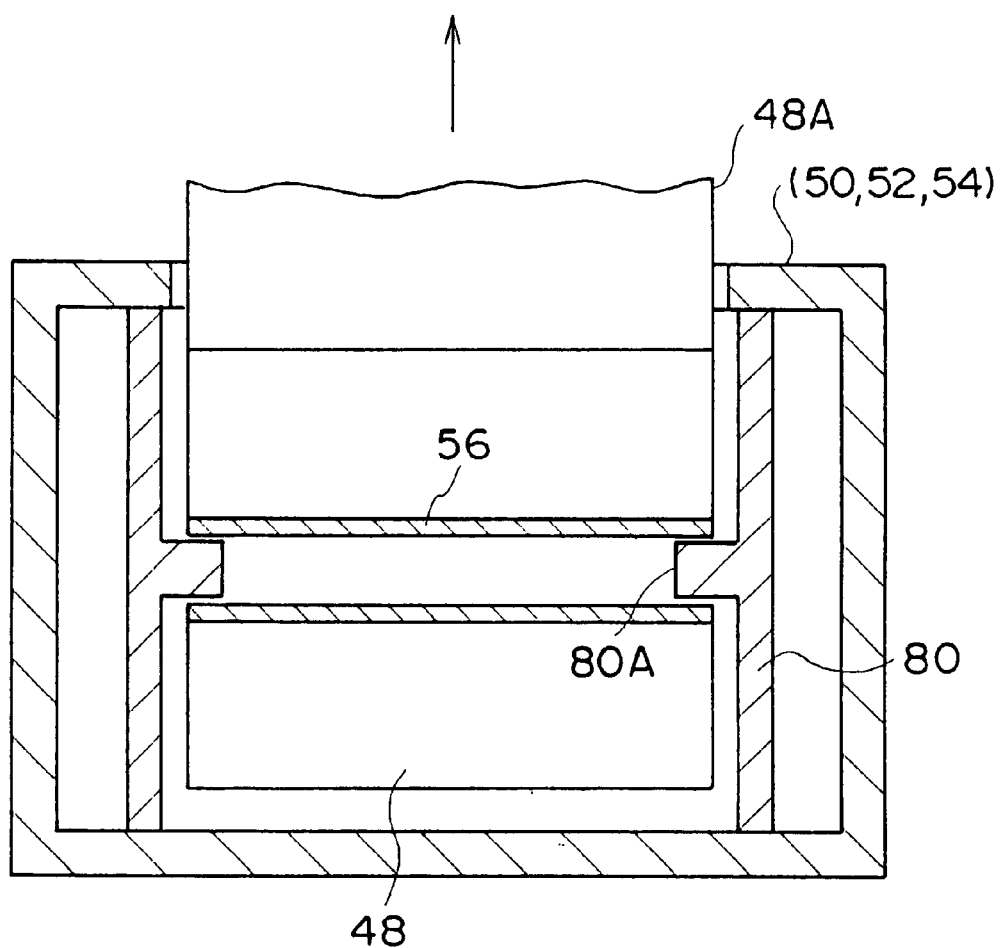
FIG. 3 is a sectional view of an image receiving material magazine.

As illustrated in FIG. 3, the image receiving magazines 50, 52, 54 of the present first embodiment are structured such that the supply reel 56, on which is wound the image receiving material 48 having the same width as an image frame, is shaft-supported by shaft portions 80A of flanges 80 which are positioned within the magazine.

Figure 4:
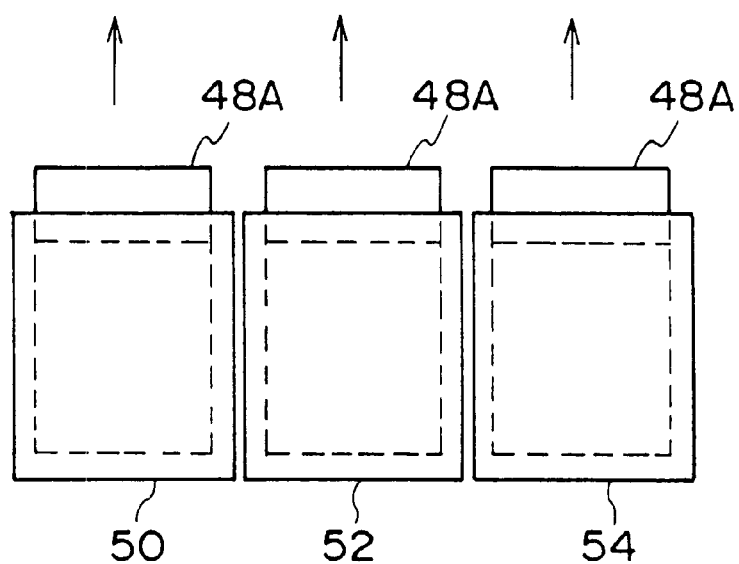
FIG. 4 is a schematic plan view of the image receiving material magazine.

In the present embodiment, as illustrated in FIGS. 2 and 4, even if a distributing mechanism is not provided, by merely feeding out the image receiving materials 48A as they are from the image receiving material magazines 50, 52, 54, the image receiving materials 48A can be laminated onto the photosensitive material 16A at which the image frames M are aligned in the transverse direction. At this time, the transverse direction positions of the image receiving material magazines 50, 52, 54 can be finely adjusted by appropriately shifting the image receiving material magazines 50, 52, 54 in the transverse direction (the direction orthogonal to the conveying direction).

As a variant example of the present embodiment, the image receiving material magazines 50, 52, 54 may be formed so as to be able to be moved greatly in the transverse direction, such that the image receiving materials fed out from the magazines 50, 52, 54 can be distributed in a direction orthogonal to the conveying direction. By forming the image receiving material magazines in this way, when, for example, image frames are exposed onto the photosensitive material 16A in plural rows (e.g., 4 rows) in a direction orthogonal to the conveying direction (but are not exposed in four rows across the transverse direction, and rather any three of the four transverse direction rows are exposed randomly), it is not necessary to dispose the magazines in four rows in the transverse direction, and in the present embodiment, the image receiving materials necessary for the photosensitive material 16A can be reliably supplied by appropriately moving the three magazines in the direction orthogonal to the conveying direction.

Figure 8:
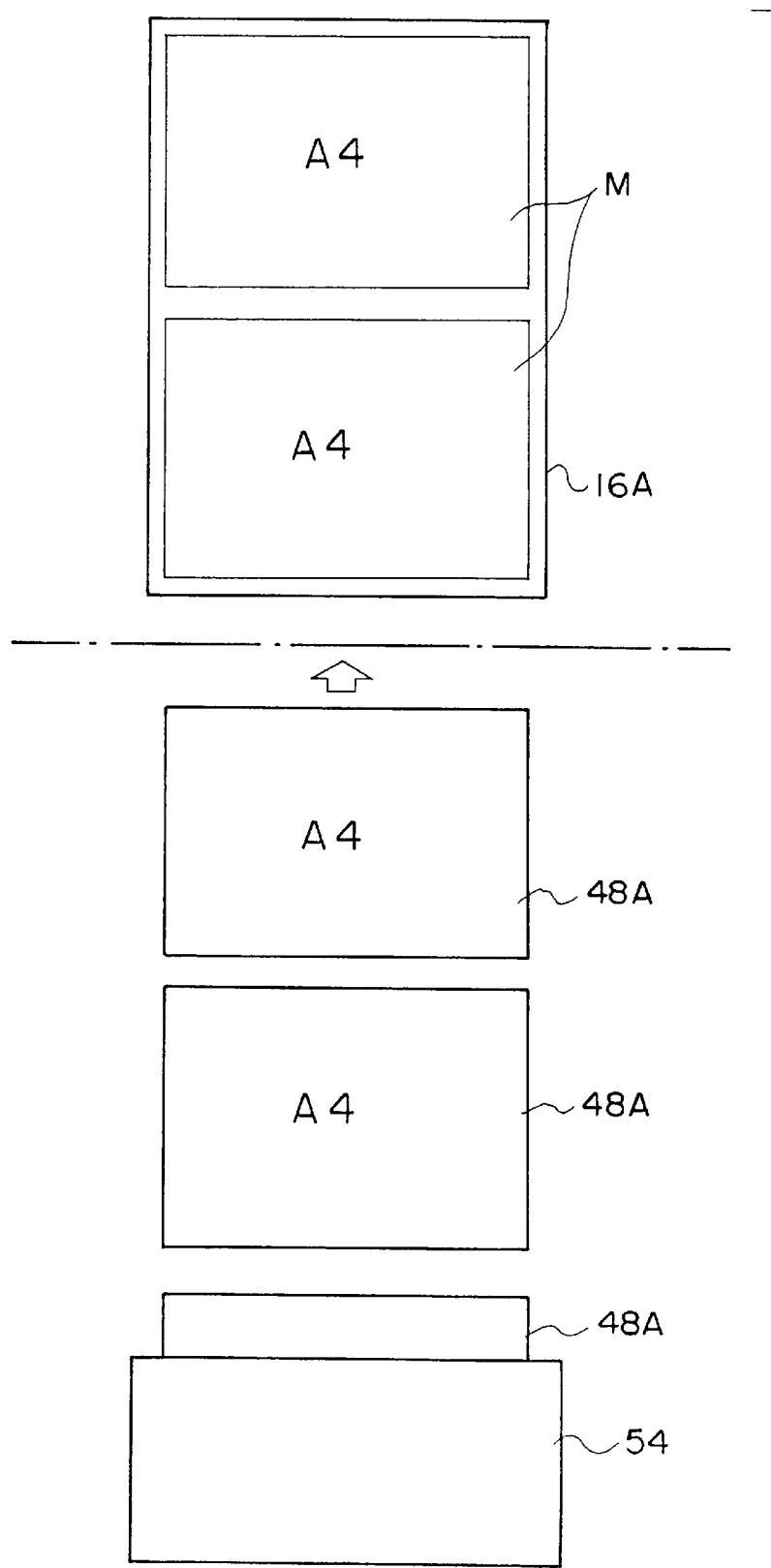
FIG. 8 is a view for explanation illustrating a positional relationship between image receiving materials and a photosensitive material.

As another variant example of the present invention, an A4-size width image receiving material magazine (see FIG. 8) may be housed, rather than the aforementioned large-size width image receiving material magazine.

Figure 9:
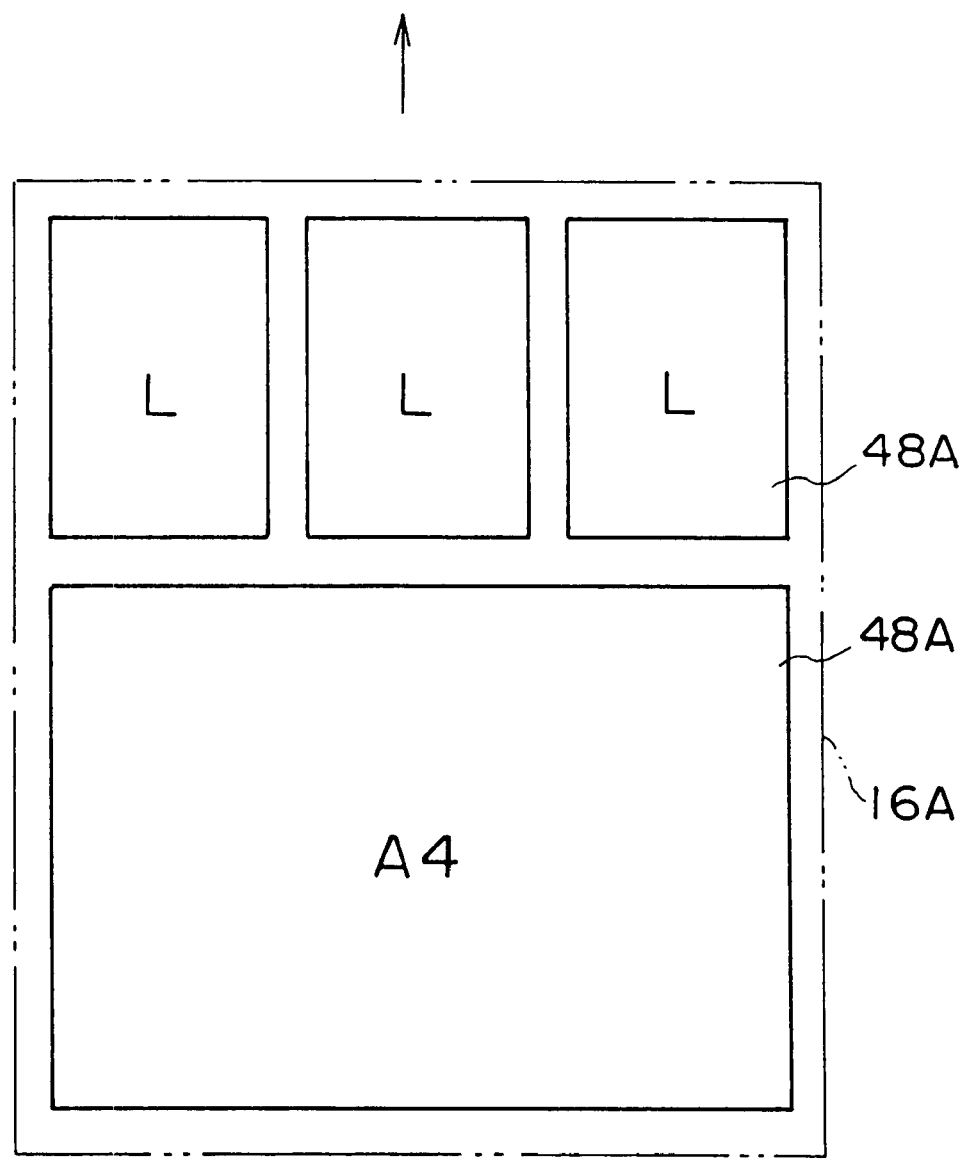
FIG. 9 is a schematic view illustrating an exposure pattern of image frames.
Figure 10:
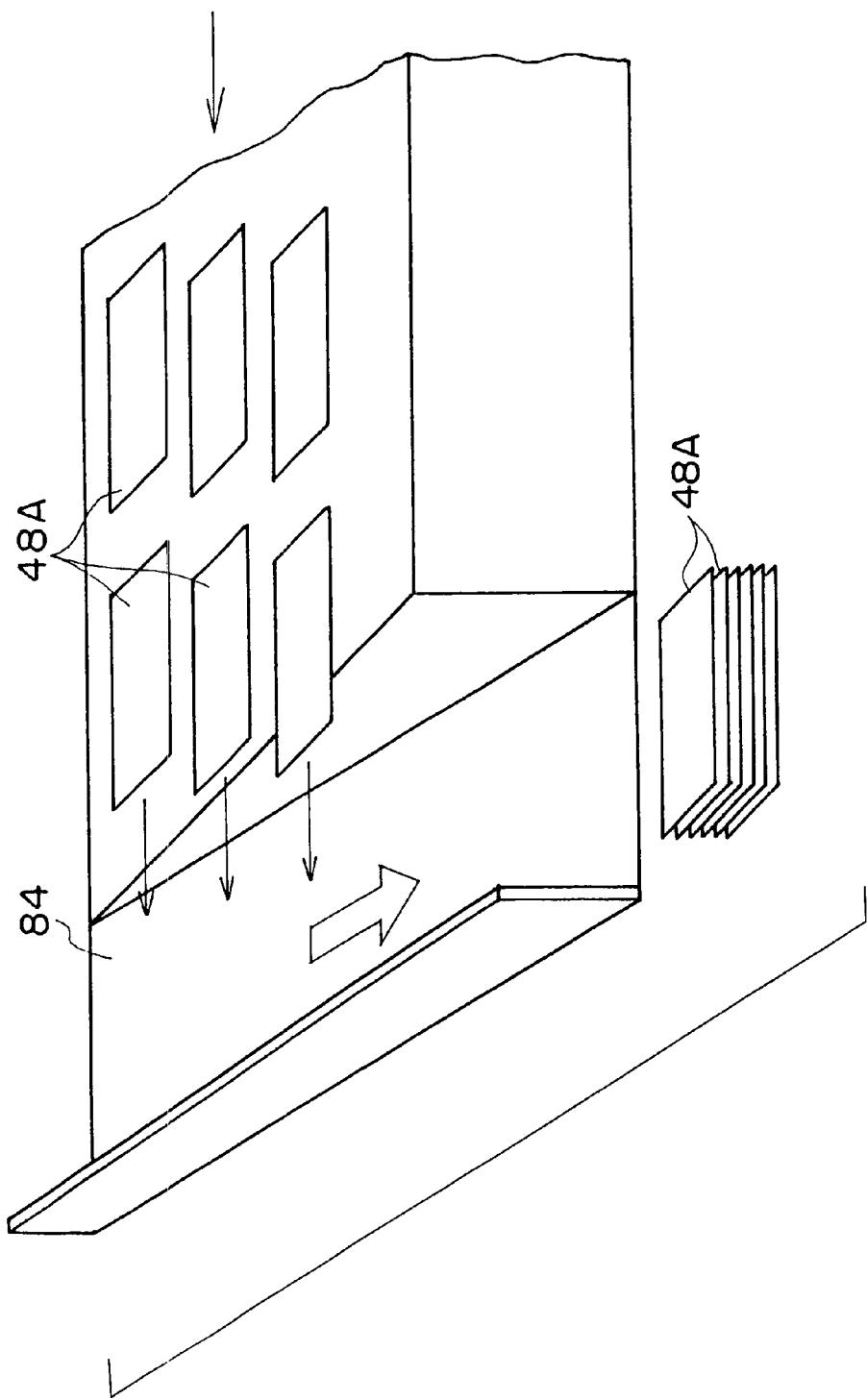
FIG. 10 is a perspective view illustrating a discharge tray.

As yet another variant example, the large-size width image receiving material magazine and the A4-size width image receiving material magazine (and if the size is appropriate, image receiving material magazine(s) of another size (other sizes) as well) can be also be housed. The image receiving material magazines of the respective sizes are selected appropriately and are able to be moved to and withdrawn from the image receiving material supplying position. In accordance with this structure, as illustrated in FIG. 9, it is possible to print an exposure pattern in which both A4-size and large size (as well as other size) images are included on a single photosensitive material 16A.

In the present embodiment as well as in other embodiments which will be described hereinafter, the selection of the magazines of the respective sizes (i.e., the selection of a magazine corresponding to the exposure pattern and the size of the image frames exposed on the photosensitive material) is carried out automatically by the control section 30, and the movement of the selected magazine to the image receiving material supplying position is carried out automatically by a known moving means (not shown).

Further, as illustrated in FIG. 2, in the present first embodiment, in order to keep the loss of the photosensitive material 16 to a minimum, the intervals between the image frames M are made small, the exposure pattern is automatically set from the print size, and the number of image frames which can be heat transferred at one time is increased, such that the printing processing speed is improved.

However, the exposure pattern of the image frames M can be automatically set such that the image receiving materials 48A are discharged in the order in which the image frame information is inputted to the control section 30 from the floppy disk 28. In this way, the prints discharged from the device will be stacked in accordance with the order in which they were photographed.

Figure 5:
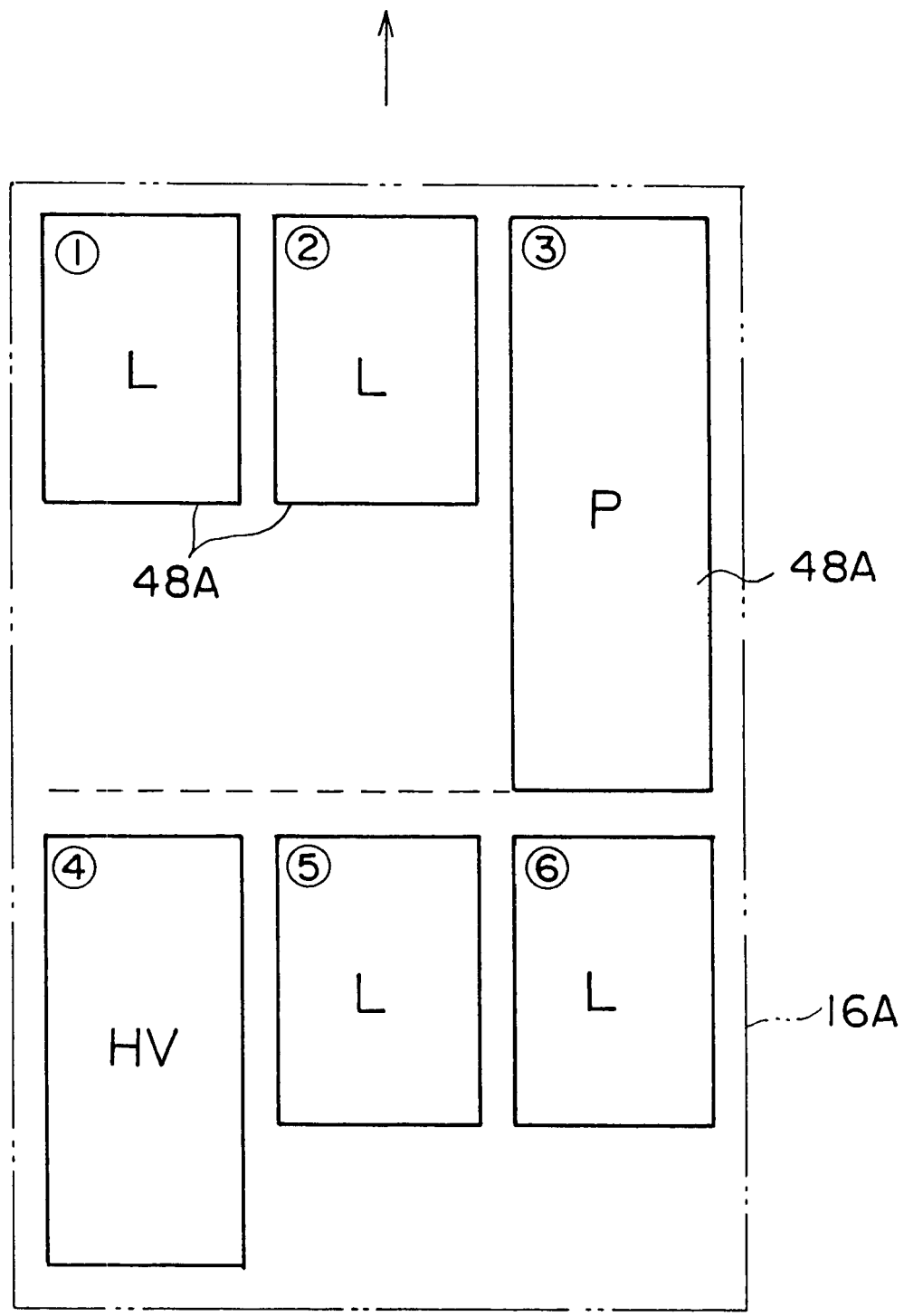
FIG. 5 is a schematic view illustrating an exposure pattern of image frames.
Figure 6:
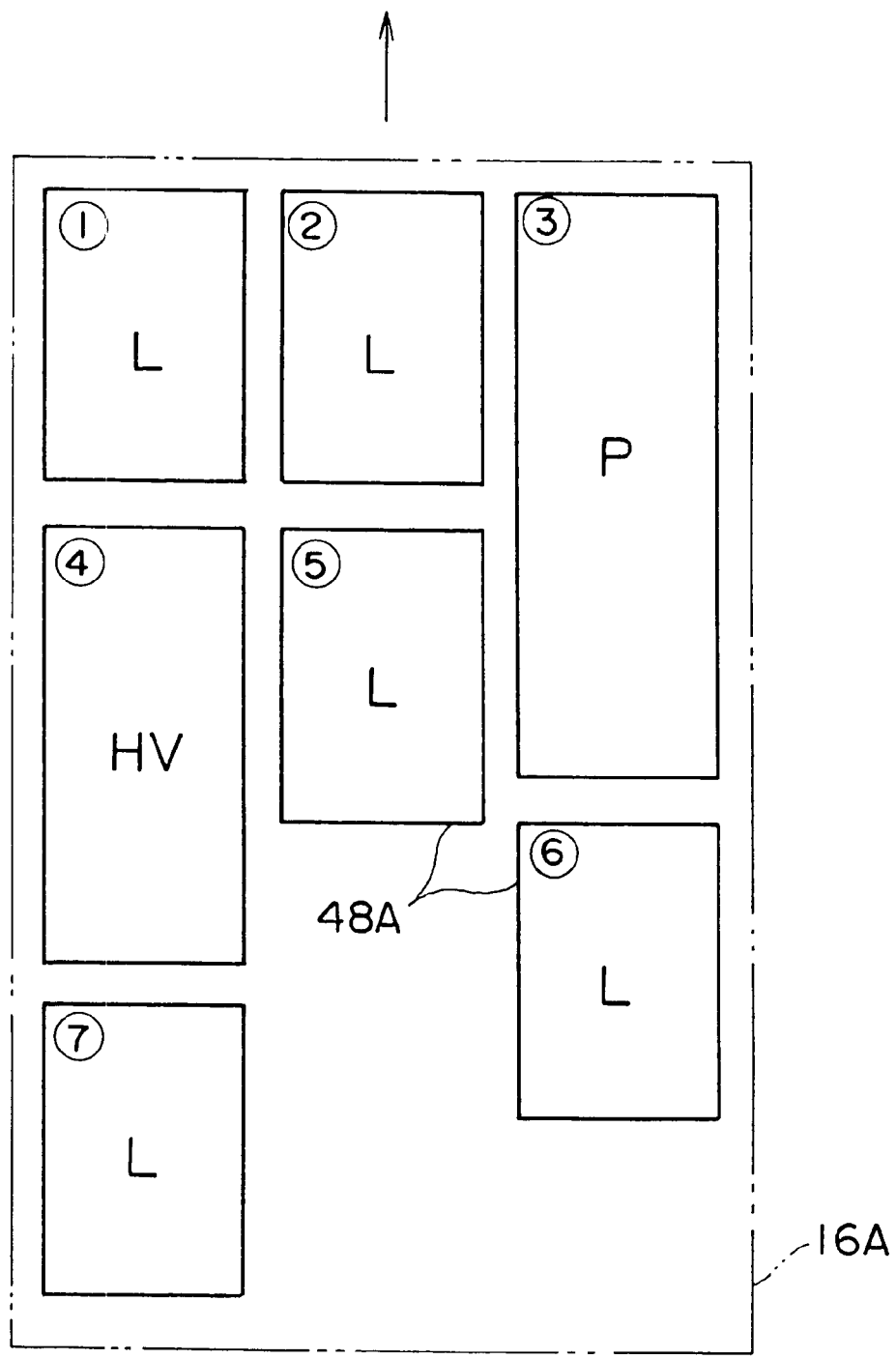
FIG. 6 is a schematic view illustrating an exposure pattern of image frames.

The present first embodiment describes a case in which mainly large-sized prints are the object of processing, and a plurality of large-sized image frames are exposed onto one photosensitive material 16A. However, as illustrated in FIG. 5 and FIG. 6, an exposure pattern can be prepared such that the third image frame P is panorama-size, and the fourth image frame HV is high-vision-size. At this time, the driving timings of the cutter 68 and the cutter 64 are controlled in accordance with the exposure pattern, and the image receiving materials 48A pulled out from the magazines 50, 54 correspond to the image frame sizes. In this way, it is possible to form various types of prints merely by setting the single photosensitive material magazine 14 and the plural image receiving magazines 50, 52, 54.

Further, in FIGS. 5 and 6, the leading portions of the respective image receiving materials are substantially aligned along a transverse line, and a reversing mechanism (tray 84, as will be described later) is provided so that the prints are discharged in the order in which they were photographed. In this case, as illustrated in FIGS. 5 and 6, the image receiving materials whose leading portions are substantially aligned along a transverse line are disposed so as to be aligned from the left to the right in the drawings in the order in which photography was carried out.

Figure 7:
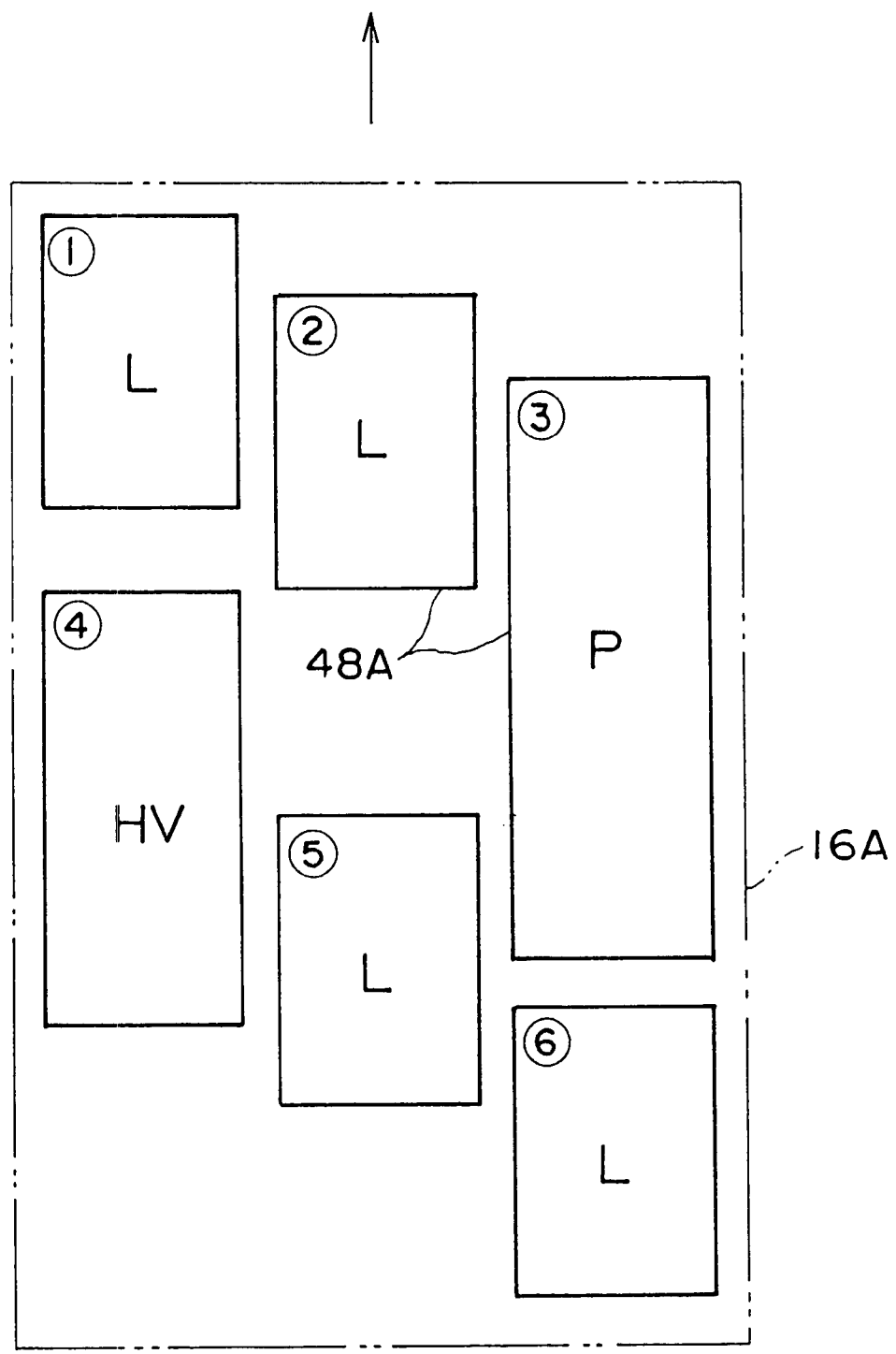
FIG. 7 is a schematic view illustrating an exposure pattern of image frames.

Or, as shown in FIG. 7, the exposure pattern of the image frames may be automatically set such that the trailing end portions of the image receiving materials 48A are disposed from downstream to upstream in the order in which the image frame information was input.

In a case in which an exposure pattern is set as in FIG. 7, there is a slight loss of photosensitive material 16A. However, even if a reversing mechanism such as the tray 84 is not provided, the prints can be discharged from the image forming device in the order in which photographing was carried out. Thus, the cost of manufacturing the device can be lowered.

Further, the image receiving material magazines of the present embodiment all house large-size-width image receiving materials. However, as described above, if an image receiving material whose width size is A4 size is stored, A4 size prints of image frames can be processed automatically (see FIG. 8). Or, as illustrated in FIG. 9, if the A4-size image receiving material magazine and the large-size image receiving material magazine are selected, an exposure pattern which includes both A4 sizes and large sizes on the single photosensitive material 16A can be printed.

In the present first embodiment, the tray 84 which is disposed in a direction orthogonal to the discharge direction may be provided at the discharge opening of the image receiving material 48A. By providing the tray 84, even in cases in which the leading portions of the respective image receiving materials are aligned substantially in one transverse line as shown in FIGS. 5 and 6, the prints can be reliably discharged in the order in which they were photographed.

However, as was described previously, the exposure pattern of the image frames may be set automatically such that the trailing end portions of the image receiving materials 48A are disposed from downstream side to upstream side in the order in which the image frame information was inputted (see FIG. 7). In this case, the prints can be discharged from the device in the order in which they were photographed without providing a reversing mechanism such as the tray 84.

Next, an image forming device relating to a second embodiment of the present invention will be described.

Figure 11:
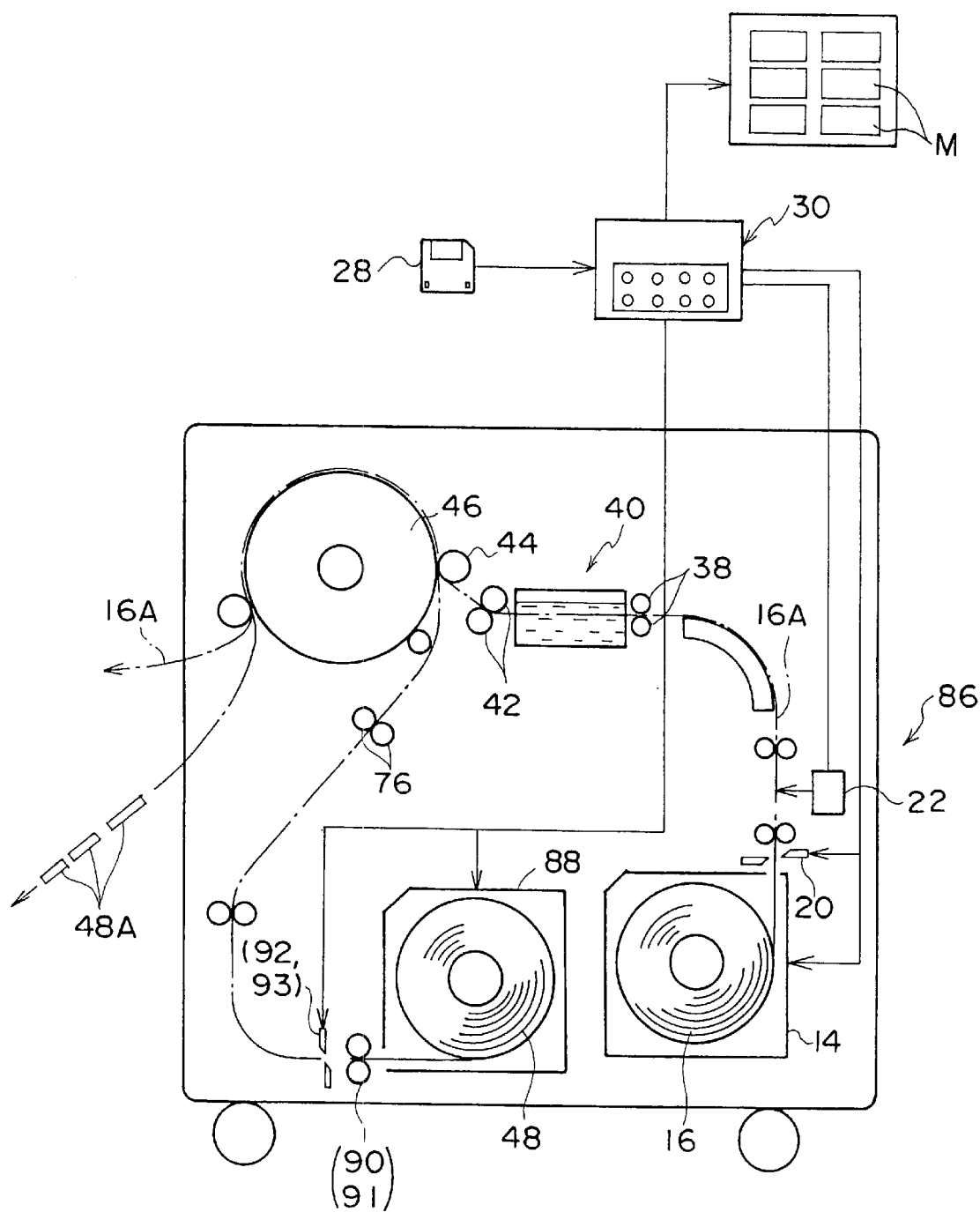
FIG. 11 is a side view illustrating an overall structure of an image forming device relating to a second embodiment.

As illustrated in FIG. 11, the basic structure of an image forming device 86 of the second embodiment is the same as that of first embodiment, but differs in that only one image receiving material magazine 88 is loaded in the image forming device 86 of the present second embodiment.

Figure 12:
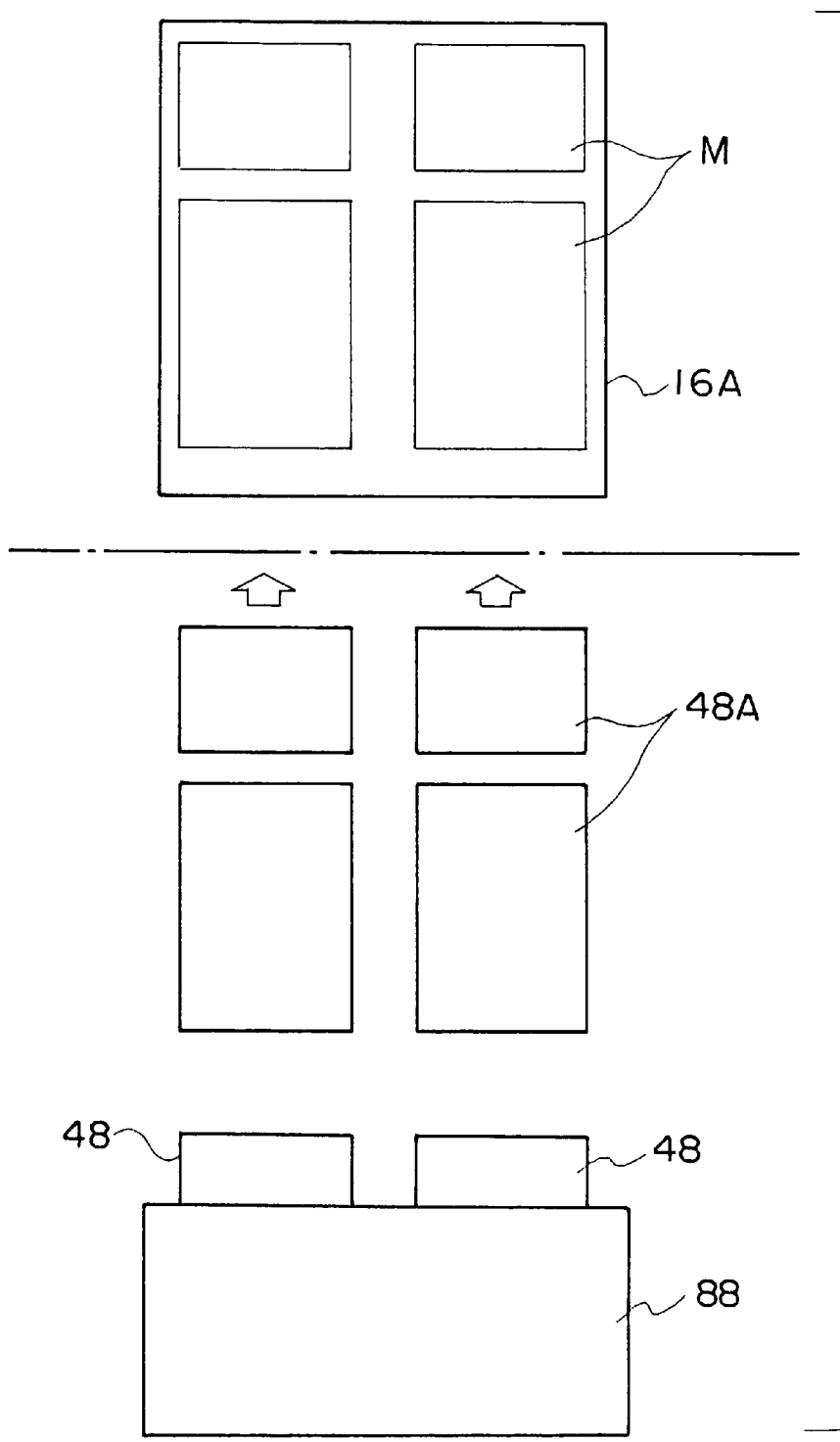
FIG. 12 is a view for explanation illustrating a positional relationship between image receiving materials and a photosensitive material.
Figure 13:
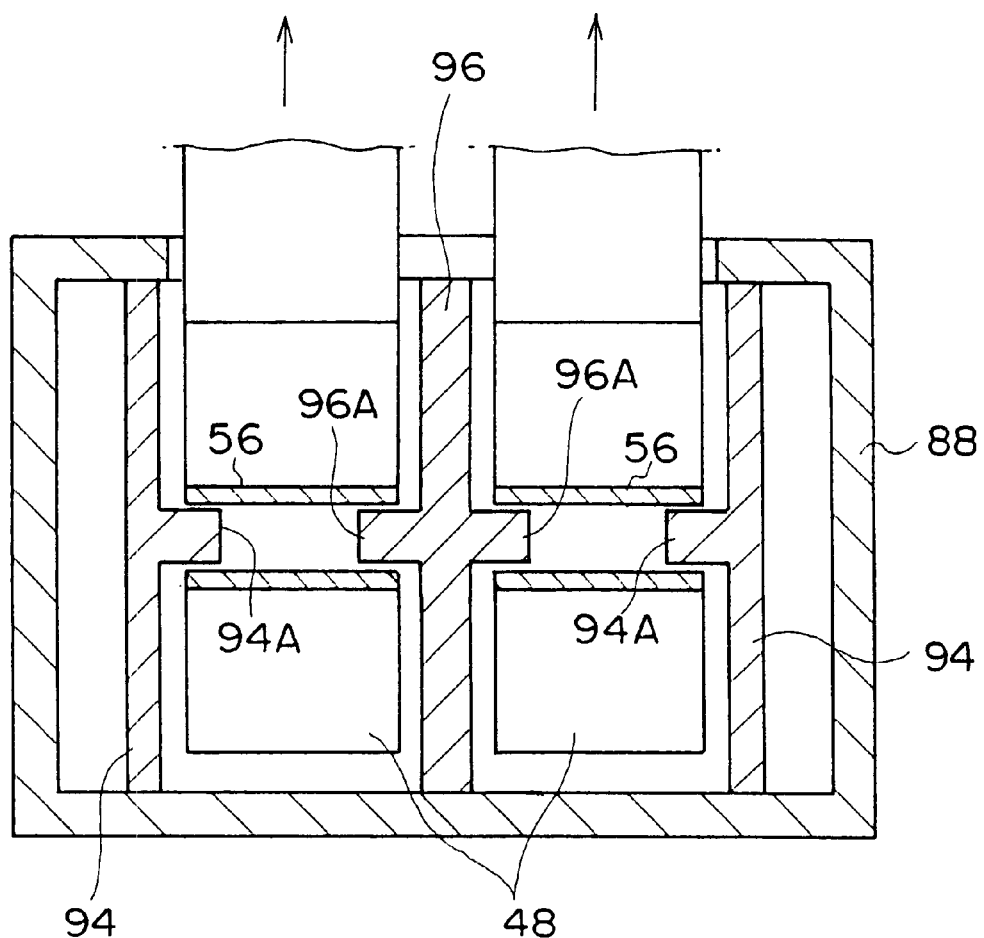
FIG. 13 is a sectional view of an image receiving magazine.

As illustrated in FIGS. 12 and 13, the image receiving material magazine 88 houses two rolls of image receiving materials along the transverse direction. Namely, when one image receiving material magazine 88 is loaded in the image forming device 86, two large-size image receiving materials 48A across the transverse direction can be supplied. Thus, the image receiving material magazine does not take up much space, and the device can be made compact.

Further, as illustrated in FIG. 13, in the structure of the image receiving material magazine in which two rolled image receiving materials are housed, the supply rolls 56, around which the image receiving materials 48 are wound, are supported coaxially by shaft portions 94A, 96A of side flanges 94 and a center flange 96.

Here, nip rollers 90, 91 and cutters 92, 93 are provided so as to be paired with the respective image receiving materials 48. By changing the cutting position at the leading end side and the trailing end side, large-size and panorama-size image receiving materials 48A can be supplied simultaneously.

Next, an image forming device 106 relating to a third embodiment of the present invention will be described.

Figure 14:
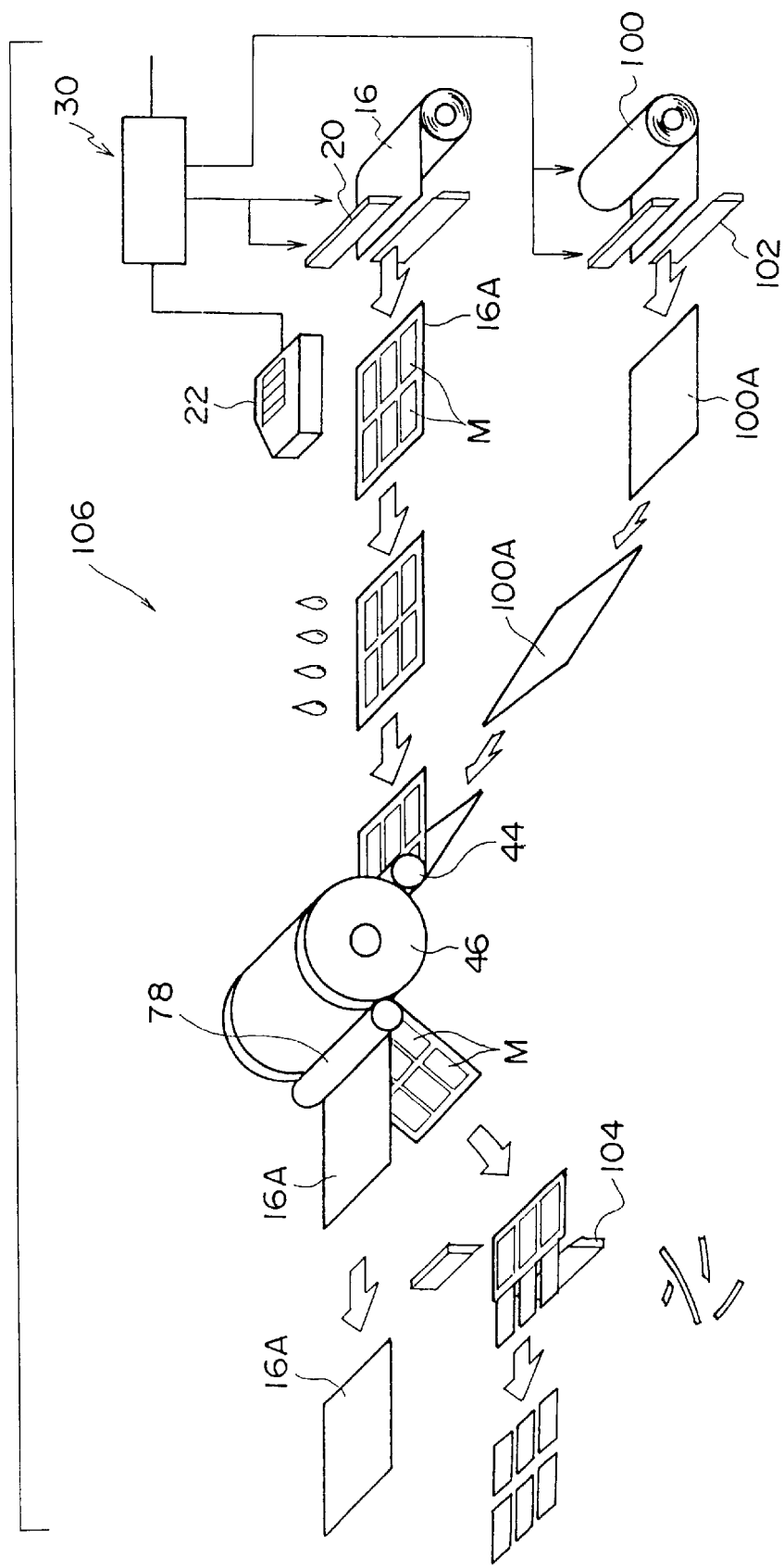
FIG. 14 is a schematic view illustrating the overall structure of an image forming device relating to a third embodiment.
Figure 15:
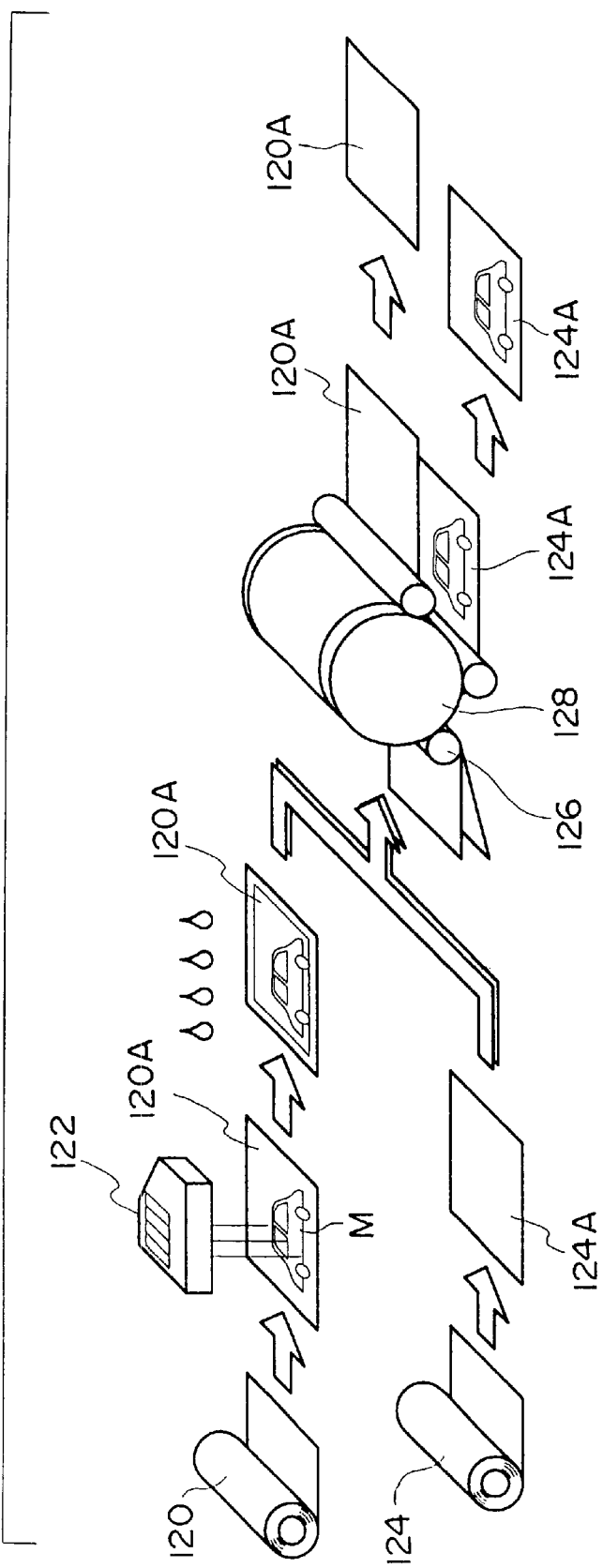
FIG. 15 is a schematic view illustrating the overall structure of a conventional image forming device.

In the present third embodiment, as illustrated in FIG. 14, an image receiving material magazine, in which an image receiving material 100 of the same width as the photosensitive material 16 is housed, is loaded in the image forming device 106. The image receiving material 100 is cut to the same size as the photosensitive material 16A by a cutter 102 (so as to become an image receiving material 100A), and the photosensitive material 16A and the image receiving material 100A are laminated together on the heat drum 46.

Then, after heat transfer, the image receiving material 100A is cut by a cutter 104 along the frames of the image frames M so as to form the respective prints. In this structure, after heat transfer, it is necessary to cut the image receiving material 100A. However, if there is one image receiving material magazine which houses an image receiving material of the same width as the width of the photosensitive material 16A, this structure can correspond to any type of exposure pattern or image frame size.

In the present third embodiment, by merely inserting the floppy disk 28 into the image forming device, for example, the designated number of prints is processed automatically without operating an operation panel 110 (see FIG. 1) of the image forming device.

At least one order information, such as designation of the image frame, designation of the number of prints, designation of the print size or the like is recorded together with image information on the floppy disk 28. Such information can be inputted by operating the operation panel 110. However, in order to suit as much as possible the convenience of the user, the device is structured so as to be able to even handle cases in which basic order information is inputted at home or via a communications line.

The floppy disk 28 is one example of an information medium, and a cartridge of a film may be used. Further, the image forming device may be structured so as to be able to handle information media which will become defect standard from now on, such as optical disks. Examples of the means for inputting information to the floppy disk 28 are a personal computer, a digital camera, or the like. Special order information may be the type of the surface of the paper, whether borders are to be included or not, image recognition of the number of persons in an image to print that number of prints, and the like.

Conditions at the time of photographing, such as the light source, whether a flash was used, the aspect ratio (top and bottom information), regular lighting/backlighting, overexposure/underexposure, the distance to the photographed object, the photographing magnification, the camera f stop value, the aperture, the shutter speed, and the like, are recorded on the floppy disk 28.

On the floppy disk 28 is also recorded editing information such as trimming, color enhancement, human figure enhancement, and the like. Also recorded on the floppy disk 28 as information to be printed onto the reverse surface of the print are the date of photographing, the time of photographing, the name of the file, the title, photographing conditions, information on the camera used, the printer code, and color correction conditions.

Due to the structure of the present invention, printing processing can be automated. The printing processing efficiency can be improved, and the loss of photosensitive material can be kept to a minimum.

What is claimed is:
1. An image forming device, comprising:
   (a) an exposure section for exposing image on a photosensitive material;
   (b) a solvent application section for applying solvent to the photosensitive material exposed at the exposure section;

(c) a heat transfer section for heat transferring the image on the photosensitive material onto an image receiving material which is superposed with the photosensitive material, wherein a plurality of image frames are exposed onto the photosensitive material at the exposure section, and one or more than two pieces of the image receiving material is superposed with the photosensitive material, corresponding to a size of the photosensitive material or a location of each of the image frames, such that the plurality of image frames are simultaneously heat transferred onto the image receiving material.

2. An image forming device according to claim 1, wherein the image receiving material is sized according to the respective image frames and the sized pieces of the image receiving material are superposed substantially simultaneously with the respective image frames.

3. An image forming device according to claim 2, further comprising:

(d) a plurality of magazines housing image receiving materials; and (e) a selecting section for selecting the magazine in accordance with an exposure pattern and a size of the image frames exposed on the photosensitive material.

4. An image forming device according to claim 2, wherein a plurality of image receiving materials are housed in a single magazine.

5. An image forming device according to claim 2, wherein the image receiving materials which are fed out from the magazines are distributed in a direction orthogonal to a conveying direction.

6. An image forming device according to claim 1, wherein the image receiving material is the same size as the photosensitive material, and is cut along frames of the image frames after heat transfer.

7. An image forming device according to claim 1, wherein the exposure section exposes the plurality of image frames on the photosensitive material such that wasted space on the photosensitive material is minimized.

8. An image forming device according to claim 1, wherein an exposure pattern of the image frames is automatically set in an order in which image frame information was inputted.

9. An image forming device according to claim 8, wherein the exposure pattern of the image frames is automatically set such that trailing end portions of the pieces of the image forming material on which the image frames have been heat transferred are disposed from a conveying direction downstream side to a conveying direction upstream side in an order in which the image frame information was inputted, and the pieces of the image receiving material are discharged in the order in which the image frame information was inputted.

10. An image forming device according to claim 8, wherein a tray which is disposed in a direction orthogonal to a discharging direction is provided at a discharge opening for the image receiving materials.

11. An image forming device according to claim 1, wherein input is possible from an information medium on which is recorded image information as well as order information, the order information being at least one of a designation of an image frame, a designation of a number of prints, and a designation of a print size.

12. An image forming device according to claim 5, wherein by moving the magazines in a direction orthogonal to a conveying direction of the image receiving materials, the image receiving materials fed out from the magazines are distributed in the direction orthogonal to the conveying direction.

13. An image forming device comprising:

(a) an exposure section which exposes a photosensitive material so as to form images;

(b) a solvent application section which applies a solvent onto an exposed photosensitive material;

(c) a heat transfer section which heat transfers the images onto an image receiving material by superposing an image receiving material with the photosensitive material to which the solvent has been applied;

(d) at least one magazine housing an image receiving material; and (e) a selecting section for selecting a magazine in accordance with an exposure pattern and sizes of image frames exposed onto the photosensitive material, wherein a plurality of image frames are exposed onto the photosensitive material at the exposure section, the selecting means selects at least one magazine in accordance with the exposure pattern and the sizes of the plurality of image frames, and the photosensitive material to which the solvent has been applied is superposed at the heat transfer section with the image receiving material which is fed out from the selected magazine.

14. An image forming device according to claim 13, wherein the image receiving material is sized according to the respective image frames and the sized pieces of the image receiving material are superposed substantially simultaneously with the respective image frames.

15. An image forming device according to claim 14, wherein a plurality of image receiving materials are stored in a single magazine.

16. An image forming device according to claim 14, wherein the image forming materials fed out from the magazine are distributed in a direction orthogonal to a conveying direction.

17. An image forming device according to claim 13, wherein the image receiving material is the same size as the photosensitive material, and is cut along frames of the image frames after heat transfer.

18. An image forming device according to claim 13, wherein the exposure section exposes the plurality of image frames on the photosensitive material such that wasted space on the photosensitive material is minimized.

19. An image forming device according to claim 13, wherein an exposure pattern of image frames is automatically set in an order in which image frame information was inputted.

20. An image forming device according to claim 16, wherein the image receiving materials fed out from the magazine are distributed in the direction orthogonal to the conveying direction by moving the magazine in the direction orthogonal to the conveying direction of the image receiving materials.

21. An image forming device according to claim 13, wherein an exposure pattern of image frames is automatically set such that trailing end portions of the pieces of the image receiving material onto which the image frames have been heat transferred are disposed from a conveying direction downstream side to a conveying direction upstream side in an order in which image frame information was inputted, and the pieces of the image receiving material are discharged in the order in which the image frame information was inputted.

* * * * *